Sept. 23, 1952 P. H. DAVIS 2,611,381
TILTING DEVICE FOR TABLEWARE USED IN CONJUNCTION
WITH THE CONVEYING BELT OF A DISHWASHING MACHINE
Filed April 23, 1948 2 SHEETS—SHEET 1

INVENTOR.
PATRICK HENRY DAVIS
BY
Florian G. Miller
Atty.

Sept. 23, 1952 P. H. DAVIS 2,611,381
TILTING DEVICE FOR TABLEWARE USED IN CONJUNCTION
WITH THE CONVEYING BELT OF A DISHWASHING MACHINE
Filed April 23, 1948 2 SHEETS—SHEET 2

INVENTOR.
PATRICK HENRY DAVIS
BY
Florean L. Miller
Atty.

Patented Sept. 23, 1952

2,611,381

UNITED STATES PATENT OFFICE 2,611,381

TILTING DEVICE FOR TABLEWARE USED IN CONJUNCTION WITH THE CONVEYING BELT OF A DISHWASHING MACHINE

Patrick Henry Davis, Erie, Pa., assignor to Champion Dish Washing Machine Company, Erie, Pa., a corporation of Pennsylvania Application April 23, 1948, Serial No. 22,873

4 Claims. (Cl. 134—67)

This invention relates generally to machines for washing dishes and more particularly to an attachment for a machine for washing utensils, dishes and the like whereby they are tilted sufficiently to remove any pooled water retained in any recesses therein and further means are provided to evaporate the residual water thereon.

Dish washing machines now on the market having a continuous conveying belt have some dishes, utensils and the like, passing therethrough which have recesses which retain water from the washing and rinsing operations of the machine resulting in excessively wet dishes leaving the machine and an excessively wet dish table at the discharge end of the machine. This is particularly true of conventional plates which are usually disposed face down on the conveying belt whereby water is retained by the annular raised bead or base on the back of the plate. All dish washing machines of the continuous feed type with a flat belt now on the market discharge dishes, utensils, etc. in an extremely wet condition thereby requiring a maximum amount of toweling.

It is, accordingly, an object of my invention to provide a dish washing machine which overcomes the above and other defects in present means for washing and drying dishes and it is more particularly an object of my invention to provide an attachment for a dish washing machine which is simple in construction, economical in cost, economical in manufacture and efficient in operation.

Another object of my invention is to provide an attachment for a dish washing machine having a continuous conveying belt, for tilting dishes discharging from the belt of the machine to remove pooled water from recesses therein and further means are provided for evaporating moisture on the dishes after they have been tilted.

Another object of my invention is to provide novel transfer members between a conveying belt of a dish washing machine and a conveying belt of an auxiliary attachment whereby dishes passing from the first mentioned conveying belt are tilted sufficiently to remove the pooled water from the recesses therein after which their angular position is changed so that the auxiliary conveying belt will remove them from the transfer members.

Another object of my invention is to provide a novel attachment for a dish washing machine of the continuous belt type whereby towelling of the dishes is reduced to a minimum or eliminated.

Other objects of my invention will become evident from the following detailed description, taken in conjunction with the accompanying drawings, in which Fig. 1 is a side elevational view of my novel attachment for a dish washing machine having a continuous conveying belt;

Figure 1:
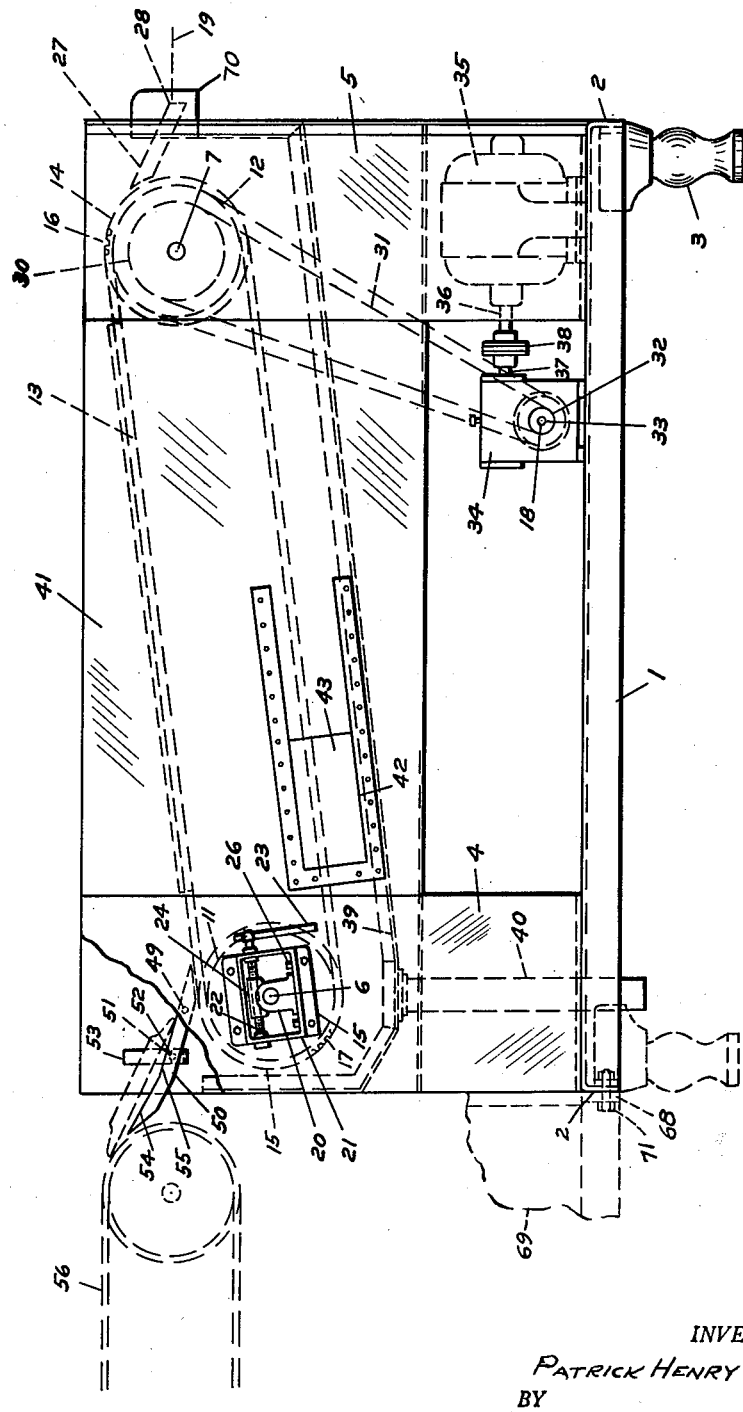
Figure 3:
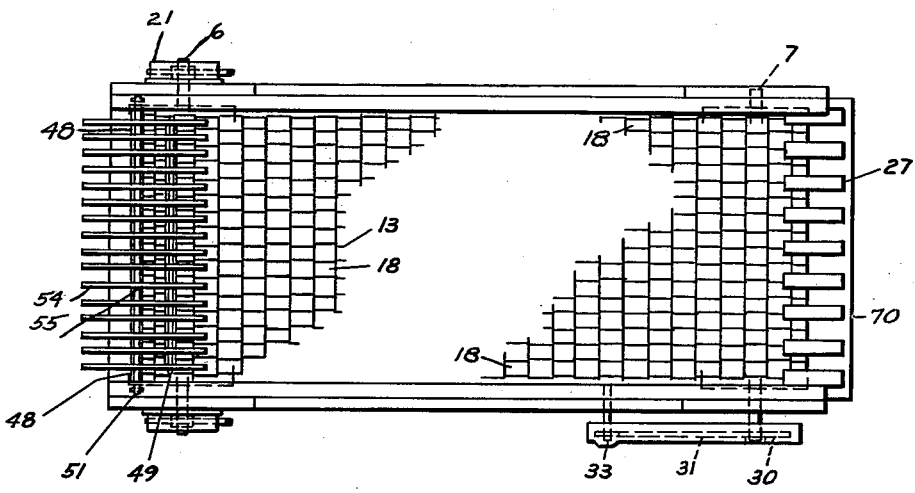
Fig. 3 is a top plan view of my novel attachment for a dish washing machine having a continuous conveying belt.
Figure 2:
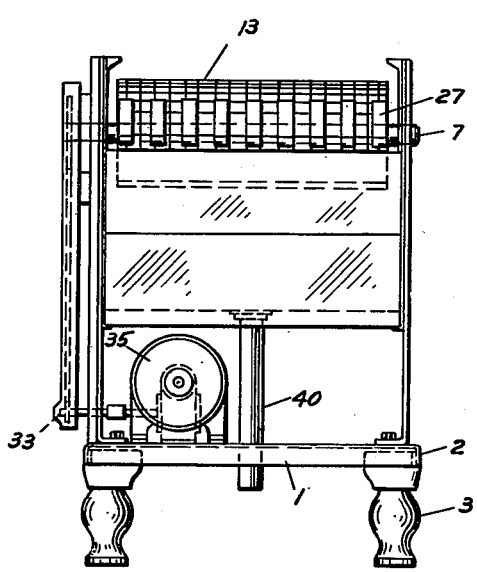
Fig. 2 is an end elevational view of my novel attachment for a dish washing machine having a continuous conveying belt.

Referring now to the drawings, I show in Figs. 1, 2 and 3 a supporting base 1 having a depending marginal flange 2 and legs 3. Spaced, parallel, upwardly extending corner plates 4 and 5 are secured to the corners of the base 1. Shafts 6 and 7 extend through apertures in the side plates 4 and 5 and drums 11 and 12 are mounted on the shafts 6 and 7. An auxiliary conveying chain or belt 13 is trained over the drums 11 and 12. The height of the shaft 6 is lower than the height of the shaft 7 so that the conveying belt 13 is inclined upwardly toward the discharge end of my novel attachment. The drums 11 and 12 have end flanges 14 and 15 with spaced transverse grooves 16 and 17 to engage spaced links 18 in the auxiliary conveying belt 13.

The shafts 6 and 7 are mounted in bearing members 20 which are movable longitudinally in the box-like members 21 secured to the outer sides of the plates 4. Screw members 22 having handles 23 are rotatably mounted in the sides of the box-like members 21 but fixed against longitudinal movement. The intermediate portion of the screw members 22 engage threaded portions 24 in bearing members 25. Stop members 26 limit the longitudinal movement of the bearing members 20. The shaft 7 moves in longitudinally extending inclined slots (not shown) in the side plates 4 so that by rotation of the handles 23, the shaft 6 can be moved forwardly or rearwardly to loosen or tighten the conveying belt 13.

A plurality of fixed, inclined conveying members 27 are disposed adjacent the discharge end of the conveying belt 13 to move dishes or the like from the belt 13 to a standard height receiving table 19 which may be disposed adjacent the discharge end of my novel attachment. The height of the shaft 7, drum 12, and conveying members 26 are such that my attachment may be used in conjunction with a table of standard height. An outwardly projecting lip 70 is disposed laterally and below conveying members 27 so water from the table may drain into the attachment.

The shaft 7 has a pulley 30 mounted thereon which is driven by a chain or belt 31 trained over the pulleys 30 and 32. Pulley 32 is mounted on a shaft 33 extending from a reduction gear housing 34. The reduction gears in the housing 34 are conventional and are driven by an electric motor 35 through suitable shafts 36 and 37 and a coupling 38. The shaft 6 or 7 may also be driven by suitable belting and pulleys or sprockets and linkage from the motor (not shown) on the dishwashing machine to which my attachment is connected. Conventional means may also be provided to change the speed of the shaft 7.

Suitable inclined bottom drain plates 39 are disposed below the conveying belt 13 and a drain pipe 40 extends therefrom to drain any liquid from my novel attachment. Side plates 41 connect with the drain plates 39 and to the corner plates 4 and 5. The side plates 41 have inspection ports 42 therein with sliding gates 43.

I show spaced transfer members 50 mounted on a cross shaft 51 which is disposed in the semi-circular grooves 52 in brackets 53 attached to the inner sides of corner plates 4. A second shaft 49 parallel to cross shaft 51 is added so that the transfer members 50 move as a unit. Spacing members 48 are disposed between the transfer members 50. The upper faces 54 and 55 of the transfer members 50 form an obtuse angle and they are so positioned that the surfaces 54 form an angular relationship with the plane of the top surface of conveying belt 56 of a conventional dish washing machine of approximately 45 to 60 degrees and the angular relationship between the top surface of the conveying belt 56 and the surface 55 of the transfer members 50 is approximately 30 degrees. It has been found that it is necessary to have a comparatively large angular relationship between the surface 54 and the upper surface of the conveying belt 56 so as to tilt plates sufficiently to remove the pooled water retained by the bead on the base portion of a plate. The same large angular relationship was used to transfer the plates to the conveying belt 13 with a straight conveying surface on the transfer members 50 but it was found that the plates moved too fast and were at too great an angular relationship with the auxiliary conveying belt 13 so that the edges of the plates damaged the auxiliary conveying belt 13. When the much lesser angle of the transfer members 50 with a straight upper surface was used, it was found that the plates would not tilt sufficiently to remove the water from the base portion thereof and there was a tendency for the plates to pile up on the transfer members 50. It was, therefore, found necessary to dispose the surfaces 54 and 55 of the transfer members 50 in different angular relationships so that a plate would tilt sufficiently to remove the pooled water therefrom and still move outwardly to approach the angular plane of the conveying belt 13 whereby it would be engaged thereby and moved therealong therewith. Furthermore, it was found that by having a comparatively high angle on the surface 54 the plates would be forced forwardly upon a change in angular relationship to fully engage a substantial portion of the plate with the conveying belt 13.

Figure 4:
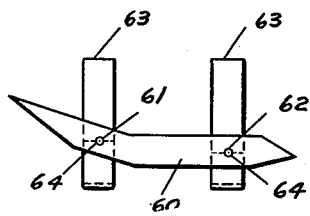
Fig. 4 is a fragmentary side elevational view of a modified support for the transfer members in my novel attachment.

A modified form of support for the transfer members is shown in Fig. 4 of the drawing wherein the transfer members 60 have two parallel supporting shafts 61 and 62 extending therethrough, each supporting shaft being supported on oppositely disposed brackets 63 having semi-circular shaped grooves 64 for receiving and supporting the ends of the shafts 61 and 62.

My novel attachment is connected to a dishwashing machine as shown in Fig. 1 by connecting the depending flanged portion 2 to the depending flange 68 on a dish washing machine 69 by means of suitable nut and bolt assemblies 71.

In operation, my novel attachment is connected to a dish washing machine 69 as shown in Fig. 1 and the supporting shaft 51 supporting the transfer members 50 is disposed in the arcuate shaped grooves 52 in the brackets 53. The motor 35 is actuated whereby the conveying belt 13 is moved about the drums 11 and 12 through pulleys 30 and 32 and belt 31. Where the shaft 6 or 7 and drum 11 or 12 are operated through the motor on the washing machine (not shown) through suitable conventional pulleys and belt, the conveying belt 13 is actuated when the motor on the washing machine is actuated. It is preferable that the belt 13 operate slightly faster than the belt 56 on the dish washing machine 69 in order that the dishes, utensils, or the like are moved away from the transfer members 50 after engagement therewith faster than they are delivered thereto by the conveying belt 56 to prevent the piling up of the dishes or the like on the transfer members 50. When dishes are passed over continuously operated belt 56 of the washing machine 69 they discharge onto the surfaces 54 of the transfer members 50 and tilt an amount sufficient to dump all, or at least most of the pooled water retained in the recesses therein. The dishes then engage the surfaces 55 of the transfer members 50 and approach the plane of the top surface of the auxiliary feeding belt 13 of my novel attachment. When the edges of dishes, such as plates, engage the belt 13, they are still being moved forwardly by the surfaces 54 of the transfer members 50 so that enough of a portion of the plates engage the belt 13 so that they frictionally engage therewith and are moved there along to the discharge end of the conveying belt 13. The dishes or the like then pass over the fixed conveying members 27 at the discharge end of the belt 13 and onto a dish table 19. The dishes, utensils or the like, are not completely dried although most of the moisture on them evaporates due to the heat therein resulting from the rinse with extremely hot rinsing water. The residual water on the dishes or the like evaporates while they remain on the conveying belt 13 and pending their discharge therefrom. By providing an auxiliary conveying belt 13, evaporation of residual water on the dishes or the like is assured. The evaporating process may be hastened by the application of a hot air jet or heated atmosphere which may be provided by any suitable conventional means. By providing a faster auxiliary belt 13 on my attachment, the dishes will be taken away from the transfer members 50 at a faster rate than that at which they are delivered by conveying belt 56 of the dish washing machine 69.

It will be evident from the foregoing that I have provided a novel attachment for a conventional dish washing machine having a continuously operated conveying belt whereby all of the pooled water in dishes, utensils and the like and particularly plates is removed and all of the residual water is evaporated therefrom on an auxiliary conveying belt. It will further be obvious that a dish washing machine may be built initially with two aligned conveying belts embodying the principles of my invention.

Various changes may be made in the specific embodiment of my invention without departing from the spirit thereof or from the scope of the appended claims.

What I claim is:

1. In combination with the conveying belt of a dish washing machine, a tilting device for tableware adapted to be disposed at the discharge end of said conveying belt comprising a frame, longitudinally spaced, parallel shafts journalled in said frame, driving and driven belt-receiving cylindrical members mounted on said shafts, means for driving one of said members, a conveying belt trained over said members, longitudinally extending, transversely spaced tilting members disposed on said frame and being inclined downwardly in the direction of the movement of said conveying belt on said tilting device and having the lower end thereof adjacent said conveying belt on said tilting device and having the upper end thereof adapted to be adjacent the discharge end of said dish washing machine, transverse shafts supported by said frame for supporting said tilting members, said tilting members each having the top surface thereof broken in two connected plane surfaces defining an obtuse angle longitudinally thereof, the upper angular top surfaces having greater angularity and less length than the lower angular top surfaces of said tilting members adjacent said conveying belt on said tilting device with respect to a horizontal plane whereby tableware passing from the discharge end of said conveying belt of said dish washing machine to the upper end of said tilting members are tilted to an angle over forty degrees to remove pooled water from recesses therein and the lower top surface changes the angular relationship of said tableware on said tilting members after the tilting operation to approach the horizontal plane of the top of said conveying belt on said tilting device.

2. In combination with a conveying belt of a dish washing machine, a tilting device as set forth in claim 1 wherein the upper angular face portion of said tilting members has an angle of forty to sixty degrees in relation to a horizontal plane and the lower top face portion of said tilting members adjacent said conveying belt on said tilting device is approximately thirty degrees in relation to a plane passing through the top of the conveying belt of said dish washing machine.

3. In combination with the conveying belt of a dish washing machine, a device for disposal adjacent the discharge end of said conveying belt of said dish washing machine for upending tableware discharged therefrom and returning the tableware to a position approaching its upright position comprising longitudinally extending, transversely spaced, tilting members each having an upper inlet end portion adapted to be supported adjacent the discharge end of the conveying belt of said dish washing machine and a lower portion having a lower top surface disposed at an obtuse angle with relation to said upper inlet top surface, the upper top surfaces adjacent said conveying belt each having an angle of over forty degrees with reference to a plane through the top surface of said conveying belt and the lower top surfaces more remote from said conveying belt on said dish washing machine having an angle less than thirty-five degrees with reference to a plane taken through the top of said conveying belt, said tilting members being inclined downwardly in the direction of the movement of said conveying belt, support means for said tilting members, and a second conveying member at the lower end of said tilting members for carrying tableware away therefrom.

4. In combination with the conveying belt of a dish washing machine, a device as set forth in claim 3 wherein the top inlet surfaces of said tilting members adapted to be disposed adjacent said conveying belt of said dish washing machine are considerably shorter longitudinally than the top surfaces thereof more remote therefrom.

PATRICK HENRY DAVIS.

REFERENCES CITED

The following references are of record in the file of this patent:

UNITED STATES PATENTS

| Number | Name | Date |
|---|---|---|
| 890,250 | Thompson | June 9, 1908 |
| 920,564 | Goldman | May 4, 1909 |
| 981,712 | Stock | Jan. 17, 1911 |
| 1,120,200 | Jensen | Dec. 8, 1914 |
| 1,765,996 | Olson | June 24, 1930 |
| 2,179,798 | Petskeyes | Nov. 14, 1939 |
| 2,208,088 | Stoyanchul | July 16, 1940 |